United States Patent [19]

Jones

[11] Patent Number: 4,866,251
[45] Date of Patent: Sep. 12, 1989

[54] REMOVING OPTICAL FIBRE ENCAPSULATION

[75] Inventor: Stephen R. Jones, Whitchurch, Great Britain

[73] Assignee: STC PLC, London, England

[21] Appl. No.: 222,004

[22] Filed: Jul. 8, 1988

[30] Foreign Application Priority Data

Jul. 18, 1987 [GB] United Kingdom ............... 8716991

[51] Int. Cl.⁴ .............................................. H05B 1/02
[52] U.S. Cl. .................................... 219/491; 219/161; 219/382; 219/359; 350/96.21; 350/96.22; 350/96.24
[58] Field of Search .............. 219/490, 491, 121.59, 219/494, 121.65, 158–160, 382–359; 350/96.2, 96.22, 96.21, 96.24, 96.33, 96.31, 96.32

[56] References Cited

U.S. PATENT DOCUMENTS

| | | | |
|---|---|---|---|
| 3,999,837 | 12/1976 | Bowen et al. | 350/96.2 |
| 4,168,109 | 9/1979 | Durmire | 350/96.22 |
| 4,648,168 | 3/1968 | Nolf et al. | 350/96.2 |
| 4,687,289 | 8/1987 | DeSanti | 350/96.2 |
| 4,691,989 | 9/1987 | Blyler, Jr. | 350/96.23 |
| 4,708,433 | 11/1987 | Kakii et al. | 350/96.22 |
| 4,753,515 | 6/1988 | Sato et al. | 350/96.22 |

Primary Examiner—M. H. Paschall
Attorney, Agent, or Firm—Lee & Smith

[57] ABSTRACT

Encapsulated optical fibres (FIG. 1A), for e.g. a submarine cable have their encapsulation removed by high velocity hot air blowers (6,7), leave free the acrylate coated fibres for splicing/jointing. An automated equipment moves the blowers progressively along the fibres to free between 0.75 and two meters.

4 Claims, 1 Drawing Sheet

REMOVING OPTICAL FIBRE ENCAPSULATION

BACKGROUND OF THE INVENTION (1) Field of the Invention

This invention relates to removing optical fibre encapsulation and is particularly useful for preparing cable ends of encapsulated fibres in a submarine optical fibre cable, although it is not limited to this application.

(2) Discussion of the Prior Art

Hitherto the cable package of our submarine cable comprised optical fibres individually coated and encapsulated with Sylguard (RTM) and Nylon (RTM) respectively. These fibres were held around a king wire with a whipping and so releasing the fibres was simply achieved by undoing the whipping Removal of the Nylon coating is done mechanically by a stripping tool which cuts a short length of the Nylon which can then be slid off. Removal of the Sylguard can be done mechanically with a stripping loop of fine wire followed by a chemical e.g. acid clean.

The present cable package comprises several coated fibres which are held by a common plastics encapsulation to form the package and the conventional techniques described above are not suitable for releasing the coated fibres from the encapsulation.

It is an object of the present invention to devise a method and apparatus for enabling the fibres to be released from the encapsulation without damaging the fibres.

SUMMARY OF THE INVENTION

According to the present invention there is provided a method of removing the encapsulation from encapsulated and coated optical fibres, comprising directing across and into contact with the encapsulated fibres a high velocity hot gas jet, whereby the combination of heat and gas velocity causes the encapsulation to be softened and removed, leaving the optical fibres with their coatings released from the encapsulation, and moving the jet and the encapsulated fibres relative to one another so the fibres become progressively released.

According to another aspect of the present invention there is provided apparatus for removing the encapsulation from encapsulated and coated optical fibres comprising support jigs for supporting the encapsulated fibres, blower means for directing a high velocity hot gas jet across and into contact with the encapsulated fibres, and means for moving the jet and the fibres relative to each other lengthwise of the fibres whereby to progressively release the fibres from their encapsulation by the combination of the heat and velocity of the gas jet.

BRIEF DESCRIPTION OF THE DRAWINGS

In order that the invention can be clearly understood reference will now be made to the accompanying drawing in which.

DESCRIPTION OF THE PREFERRED EMBODIMENT

Figure 1:
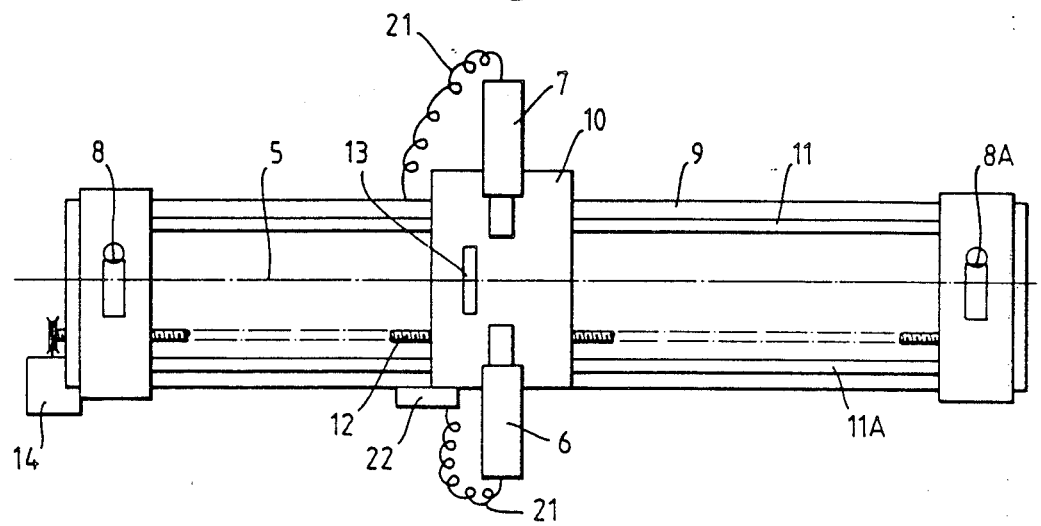
FIG. 1 shows schematically apparatus for preparing the ends of the cable for jointing, according to an embodiment of the present invention.
Figure 1A:
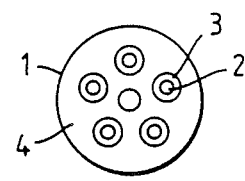
FIG. 1A shows a cross-section of a cable package suitable for use in the apparatus of FIG. 1

Referring to the drawing a cable 1 comprising a plurality of optical fibres 2 having acrylate secondary coatings 3 is embedded in an elastomeric encapsulation 4, which in this embodiment is a material sold under the trade name "Hytrel" (RTM)

The equipment comprises a pair of high velocity hot air blowers 6 and 7 diametrically opposed to one another on opposite sides of the axis 5 of the cable 1. A blower suitable for use in this application is one marketed by the company Leister, in particular their electric hot air welding pistol type "Diode" which has electronic temperature adjustment between ambient and 700° C.

The cable is secured in jigs 8 and 8A on a structure 9.

A moving table 10 carried on guides 11,11A supports both the hot air blowers 6 and 7, and a lead screw 12 moves the hot air blowers slowly lengthwise along the cable.

We have found that the combination of the hot air temperature and the velocity of the air jets effectively removes the Hytrel encapsulation from the optical fibres, thereby leaving the fibres free with their acrylate coatings The removed Hytrel falls to the ground as free globules which quickly harden. The fibres can then be spliced to other fibres or joined to opto electronic devices, in a cable termination or joint.

Figure 1B:
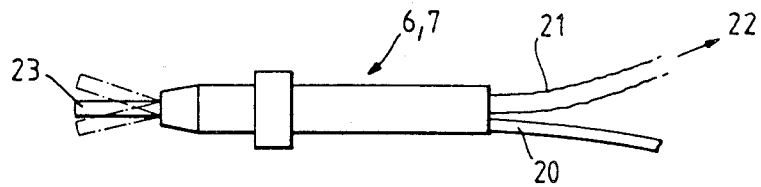
FIG. 1B shows part of the apparatus of FIG. 1.

The welding pistol is shown somewhat schematically in FIG. 1B and has an electric supply lead 20, and an air hose 21 for connection to a high pressure blower 22 mounted on the equipment of FIG. 1. The air flow can be between 100 and 900 liters per minute, and we have found that an air flow in the range 800 to 900 liters per minute through the nozzle 23 of diameter 6 mm, and at a temperature in the range of 160° C. to 220° C., to be suitable. We can strip one meter of Hytrel (RTM) encapsulated fibre in about 1 hour.

As shown the nozzle 23 can be swivelled and we have found it important to ensure that the flow is directed accurately at the cable axis.

Clearly the temperature, flow rate and feed rate are all interdependent, but the temperature of the gas jet must exceed the softening temperature of the plastics encapsulation 4.

The table 10 also carries a guide ring 13 through which the cable passes and serves to locate the cable accurately at the centre of the opposed hot air blower 6 and 7 and also serves to support the fibres as they become free of their encapsulation. As viewed in the drawing the table will move from left to right as the lead screw 12 is driven by the motor 14. The blowers provide a gas velocity of about 300 m/sec at a temperature of about 200° C. and the fibres will be released at about 3 cm every 2 minutes. It will traverse about 0.75 to 2.0 meters of cable, completely freeing the fibres from their encapsulation.

Although the gas blowers are shown exactly diametrically opposed (180°) it would be possible for them to be at an angle of between 90° and 180°, and they could also be inclined towards the cable axis instead of being at right angles to the axis, e.g. up to 20° inclination.

I claim:

1. A method of removing the encapsulation from encapsulated and coated optical fibers, comprising directing across and into contact with the encapsulated fibers two high velocity opposed hot gas jets, whereby the combination of heat and gas velocity causes the encapsulation to be softened and removed, leaving the optical fibers with their coatings released from the encapsulation, and moving the jets and the encapsulated fibers relative to one another so the fibers become progressively released.

2. A method as claimed in claim 1 wherein the encapsulated fibers are held stationary and the hot gas jets, are moved longitudinally of the fibers.

3. A method as claimed in claim 1, comprising supporting the fibers in a guide close to the jets.

4. A method as claimed in claim 2, comprising supporting the fibers in a guide close to the jets.

* * * * *